(12) United States Patent  (10) Patent No.: US 8,339,732 B2
Juang et al.  (45) Date of Patent: Dec. 25, 2012

(54) BASEPLATE WITH RECESSED REGION IN A HARD-DISK DRIVE (HDD)

(75) Inventors: Jia-Yang Juang, Santa Clara, CA (US); Fu-Ying Huang, San Jose, CA (US); Takashi Tomita, Yokohama (JP)

(73) Assignee: HGST Netherlands B.V., Amsterdam (NL)

( * ) Notice: Subject to any disclaimer, the term of this patent is extended or adjusted under 35 U.S.C. 154(b) by 303 days.

(21) Appl. No.: 12/881,017

(22) Filed: Sep. 13, 2010

(65) Prior Publication Data

US 2012/0063026 A1  Mar. 15, 2012

(51) Int. Cl.
G11B 33/14 (2006.01)
(52) U.S. Cl. ..................................... 360/99.16
(58) Field of Classification Search ............... 360/99.16
See application file for complete search history.

(56) References Cited

U.S. PATENT DOCUMENTS

| | | | |
|---|---|---|---|
| 4,863,031 A | 9/1989 | Tanaka et al. | |
| 5,453,889 A | 9/1995 | Alt | |
| 6,271,987 B1 | 8/2001 | Allsup et al. | |
| 6,275,353 B1* | 8/2001 | Briggs | 360/99.16 |
| 6,487,038 B1 | 11/2002 | Izumi et al. | |
| 6,735,043 B2 | 5/2004 | Bernett et al. | |
| 6,791,790 B2 | 9/2004 | Lee | |
| 6,801,387 B1 | 10/2004 | Rahman | |
| 7,072,140 B2 | 7/2006 | Asano et al. | |
| 7,307,811 B2 | 12/2007 | Xu et al. | |
| 7,420,775 B2* | 9/2008 | Lim | 360/97.19 |
| 7,428,741 B2* | 9/2008 | Kim et al. | 720/648 |
| 7,457,078 B2 | 11/2008 | Fukaya et al. | |
| 7,757,751 B2 | 7/2010 | Zhou et al. | |
| 2003/0206368 A1* | 11/2003 | Choi | 360/97.01 |
| 2006/0007601 A1 | 1/2006 | Cho | |
| 2007/0127154 A1 | 6/2007 | Kim et al. | |

* cited by examiner

*Primary Examiner* — Mark Blouin
(74) *Attorney, Agent, or Firm* — Christopher J. Brokaw; Brokaw Patent Law PC (57) ABSTRACT

Approaches for a hard-disk drive (HDD) baseplate comprising a recessed region that provides additional clearance for a disk. The protective enclosure of the HDD comprises a baseplate. The surface of the baseplate, which opposes a magnetic-recording disk, comprises a recessed region near the outer diameter (OD) of the magnetic-recording disk. The recessed region prevents the disk from being damaged through inadvertent physical contact with the baseplate, which may arise when the HDD receives a mechanical shock. The recessed region may be designed to minimize the damage to the disk if physical contact between the disk and the baseplate does occur. The recessed region may have a variety of shapes, such as a circular indentation or one or more non-contiguous regions in the baseplate where physical contact between the disk and the baseplate is deemed likely to occur.

20 Claims, 9 Drawing Sheets

Top View of Baseplate

Baseplate 50      Recessed Region 52 in Surface of Baseplate near OD of disk

Cross-sectional View of Baseplate and Disks

FIG. 9D

BASEPLATE WITH RECESSED REGION IN A HARD-DISK DRIVE (HDD)

FIELD OF THE INVENTION

Embodiments of the invention relate to the protective enclosure of a hard-disk drive (HDD).

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. An actuator relies on suspension's force on the read/write head to provide the proper distance between the read/write head and the surface of the magnetic-recording disk while the magnetic-recording disk rotates. A read/write head therefore is said to "fly" over the surface of the magnetic-recording disk. When the magnetic-recording disk stops spinning, a read/write head must either "land" or be pulled away onto a mechanical landing ramp from the disk surface.

SUMMARY OF THE INVENTION

Figure 1:
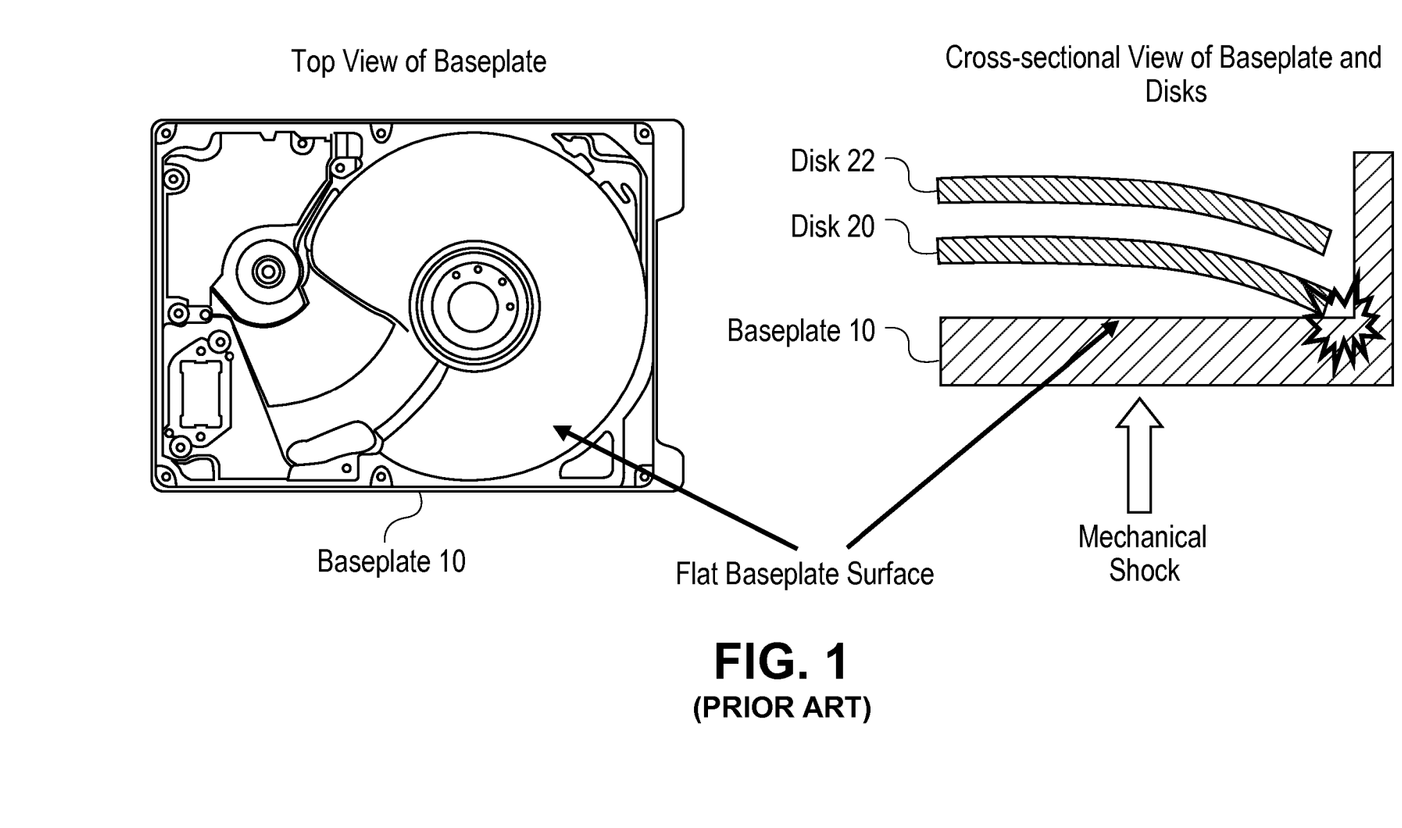
FIG. 1 illustrates a disk making physical contact with a baseplate as a result of current approaches.

The protective enclosure of a hard-disk drive (HDD) may comprise a baseplate and a cover. FIG. 1 depicts an exemplary baseplate according to the prior art. As shown in FIG. 1, baseplate 10 has a smooth, flat surface facing one or more magnetic-recording disks. It is observed that when an HDD receives a bump or mechanical shock, the magnetic-recording disk closest to baseplate 10 (which corresponds to disk 20 in FIG. 1) may make contact with baseplate 10, as depicted in the cross-sectional view shown in FIG. 1. Such physical contact between baseplate 10 and disk 20 is undesirable as it may bend, puncture, scrap, or otherwise damage disk 20 in a manner that renders disk 20 partially or wholly inoperable.

The amount of clearance between baseplate 10 and disk 20 is constrained by many factors, and in practice, is not easy to adjust. For example, the thickness of baseplate 10 may be reduced to provide additional clearance between baseplate 10 and disk 20; however, doing so may negatively affect the durability of baseplate 10.

Figure 2:
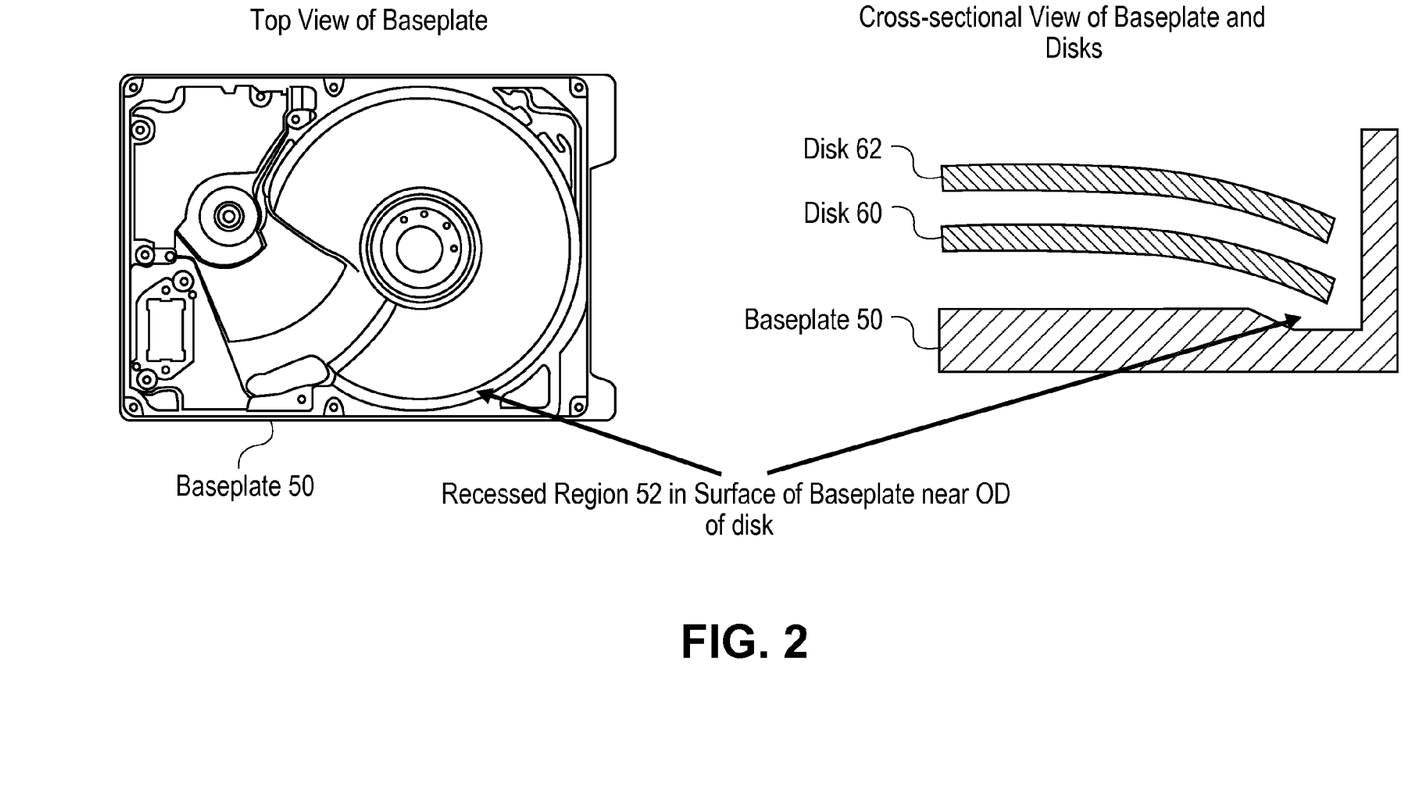
FIG. 2 illustrates a top view and a cross-sectional view of a recessed region of a baseplate according to an embodiment of the invention.

Advantageously, embodiments of the invention provide for a baseplate which comprises a recessed region near the outer diameter (OD) of the magnetic-recording disk. The recessed region increases the amount of clearance between the baseplate and the magnetic-recording disk where the disk is likely to make contact with the baseplate, and thus, the likelihood of the magnetic-recording disk making physical contact with the disk is significantly reduced. FIG. 2 illustrates one embodiment of the invention. As shown in FIG. 2, recessed region 52 is located near the outer diameter (OD) of disk 60 is baseplate 50. In the embodiment shown in FIG. 2, recessed region 52 is a circular indentation in baseplate 50; however, in other embodiments, recessed region 52 may be one or more non-contiguous portions, may have a variety of different shapes, and may be located at a variety of different locations.

Recessed region 52 may be located in any location on baseplate 50 in which physical contact between disk 60 and baseplate 50 is deemed likely to occur. Recessed region 52 provides for the localized increase in the clearance between baseplate 50 and disk 60 without affecting other design constraint of baseplate 50. For example, recessed region 52 may be constructed without adding a new part or packaging. The increased clearance between baseplate 50 and disk 60 provided by recessed region 52 eliminates or reduces the possibility of baseplate 50 and disk 60 coming in physical contact with each other in response to a mechanical shock to the HDD.

Recessed region 52 may be designed to minimize the damage to disk 60 if physical contact between disk 60 and baseplate 50 does occur. For example, recessed region 52 may have a physical structure ensuring disk 60 makes physical contact with recessed region 52 at an area of disk 60 called a "non-data zone," which is a region of disk 60 in which data is not written to or read from. As another example, recessed region 52 may comprise a dampening material that is designed to protect disk 60 from harm upon disk 60 making physical contact with recessed region 52.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a hard-disk drive (HDD) baseplate comprising a recessed region providing targeted clearance for a disk are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Recessed regions according to embodiments of the invention may be used in a variety of different storage media which employ rotating platters or disks. For purposes of providing a concrete example of particular embodiments, embodiments of the invention shall be described with reference to a recessed region in the baseplate of a hard-disk drive (HDD) employing a magnetic-recording disk; however, embodiments of the invention may be used in any type of storage media employing rotating platters or disks.

Figure 3:
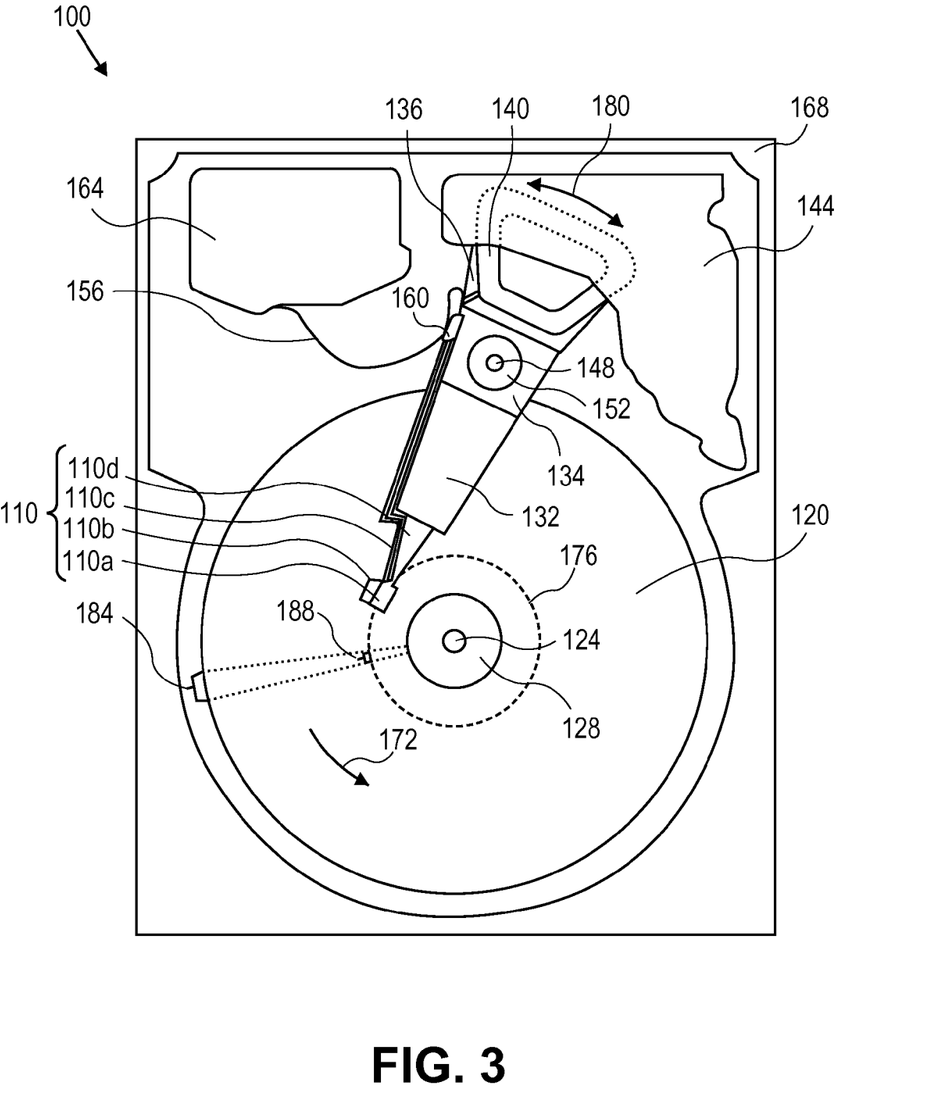
FIG. 3 is a plan view of an HDD according to an embodiment of the invention.

In accordance with an embodiment of the invention, a plan view of a HDD 100 is shown in FIG. 3. FIG. 3 illustrates the functional arrangement of components of the HDD including a slider 110b that includes a magnetic-recording head 110a. The HDD 100 includes at least one head gimbal assembly (HGA) 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 3, in accordance with an embodiment of the present invention, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 3, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110b including the head 110a.

Figure 4:
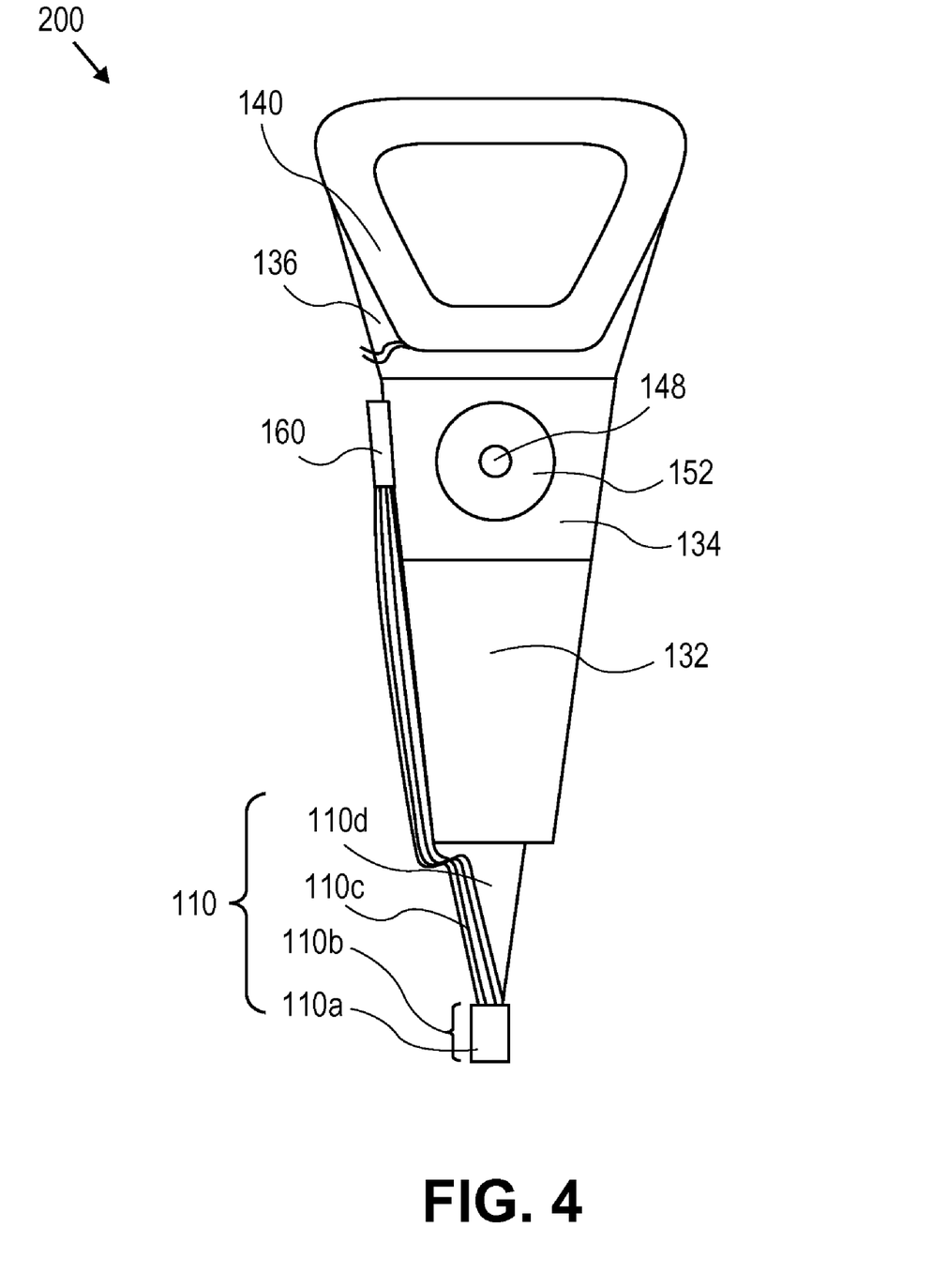
FIG. 4 is a plan view of a head-arm-assembly (HAA) according to an embodiment of the invention.

With reference now to FIG. 4, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 4, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Figure 5:
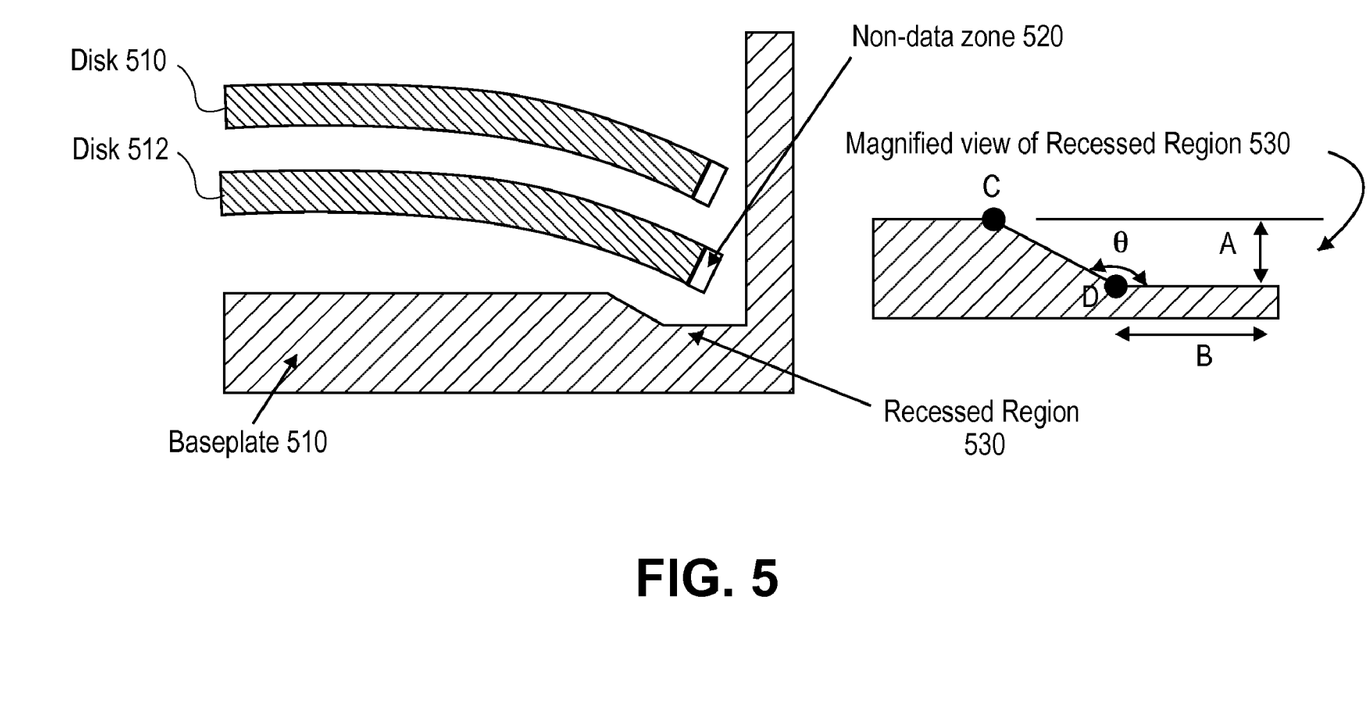
FIG. 5 is a cross-sectional view of a recessed region and the non-data zone of a disk according to one embodiment of the invention.

Using a Recessed Region to Provide Additional Clearance Between the Baseplate and a Disk FIG. 5 is a cross-sectional view of recessed region 530 according to one embodiment of the invention. As shown in FIG. 5, recessed region 530 is located in baseplate 510 near the outer diameter (OD) of disk 512. While two disks (namely disk 510 and 512) are depicted in FIG. 5, embodiments of the invention may be employed in a storage medium having any number of disks, as recessed region 530 may provide additional clearance to whichever disk is closest to baseplate 510 regardless of how many other disks are employed.

FIG. 5 depicts a magnified view of recessed region 530. In an embodiment, the clearance between baseplate 510 and disk 512 (value X in FIG. 5) may typically range from 0.3-0.4 mm. In an embodiment, the depth of recessed region 530 (value A in FIG. 5) is generally 50% of the clearance between baseplate 510 and disk 512 (value X in FIG. 5) and is generally around 0.2 mm. In an embodiment, the values of value B and angle θ are large enough to ensure that disk 512 does not contact point C. For example, the value B may be 2-4 mm and the angle θ may be 170°-175°. Note that point C and point D may be angled corners or rounded, which shall be explained in greater detail below with reference to FIGS. 9A-9D.

FIG. 5 also illustrates a non-data zone of disks 510 and 512. A non-data zone, such as non-data zone 520, is a portion of a disk to which no data is written and from which no data is read. In an embodiment, non-data zone 520 may be 0.5-1 mm in length extended from the outer diameter. The non-data zone is designed to accommodate the ramp upon which the head may rest when not in operation. To avoid any potential data loss, the structure and placement of recessed region 530 may be designed to ensure that, if disk makes physical contact with recessed region 530 (which hopefully can be avoided by providing enough clearance between disk 512 and baseplate 510 via recessed region 530), then only non-data zone 520 of disk 512 can make physical contact with recessed region 530. This advantageously avoids or minimizes the possibility that a portion of disk 512, to which data is written or from which data is read, may become scratched or otherwise damaged via physical contact with recessed region 530, which may result in data loss.

Figure 6:
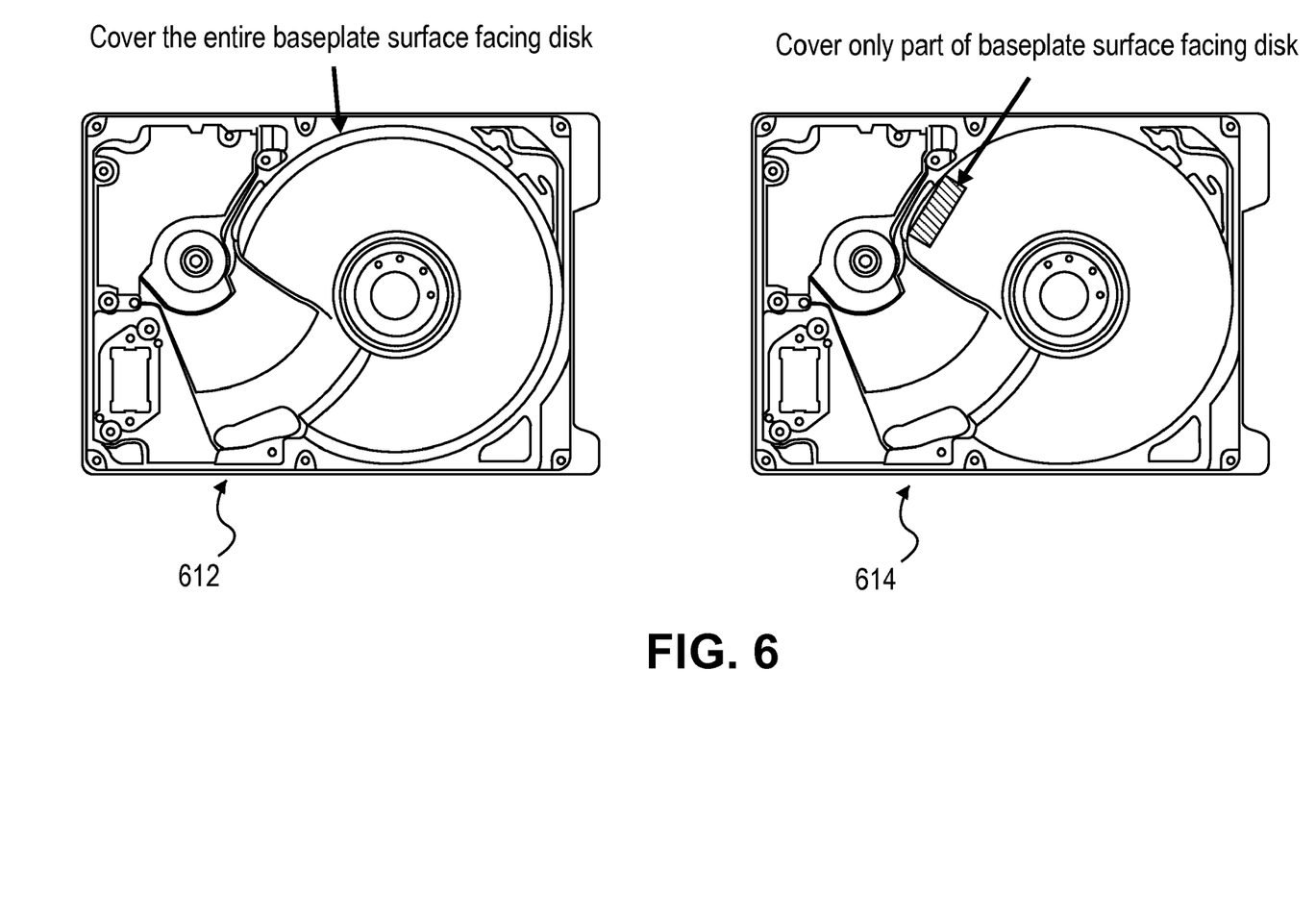
FIG. 6 is an illustration of exemplary locations of recessed regions according to embodiments of the invention.

Recessed regions according to embodiments of the invention may be implemented in a variety of different shapes. FIG. 6 is an illustration of some exemplary locations of recessed regions according to embodiments of the invention. As shown by embodiment 612, a recessed region 52 may be a circular indentation or groove in the baseplate in alignment with the outer diameter (OD) of the disk. In other embodiments, such as embodiment 614, the recessed region need not have a circular shape, but instead, may be non-symmetrical. For example, in embodiment 614, the shape of the recessed region corresponds to a segment of the circular shape of the magnetic-recording disk. Further, while not depicted, other embodiments of the invention may employ two or more non-contiguous recessed regions in the baseplate.

Figure 7:
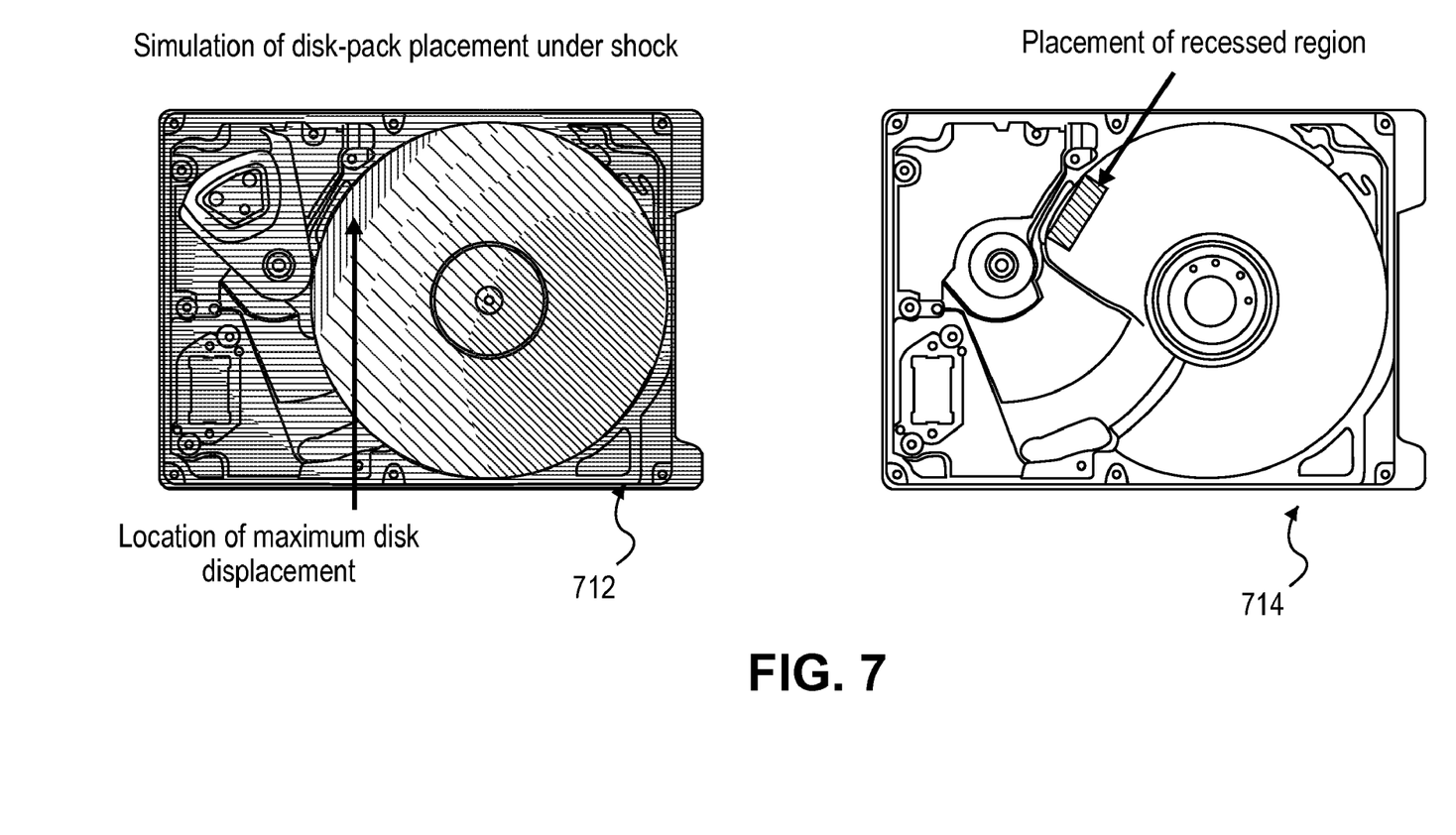
FIG. 7 is a first illustration depicting how to determine the location of a recessed region according to an embodiment of the invention.

Baseplate designs may differ between various HDDs. The design of the baseplate is a factor in determining where a recessed region should be located. This is so because different baseplate designs may have difference amounts of clearance between the disk and/or have different amounts or types of protrusions. To illustrate, consider FIG. 7, which is an illustration depicting how to determine the location of a recessed region according to another embodiment of the invention. Illustration 712 depicts a HDD undergoing a mechanical shock. The location of maximum disk displacement is shown in illustration 712 as being on one side of the disk (corresponding to a segment of the circular shape of the magnetic-recording disk). As a result, the recessed region is placed at this area of maximum disk placement (as depicted in illustration 714) to provide additional clearance between the baseplate and the disk at this location.

Figure 8:
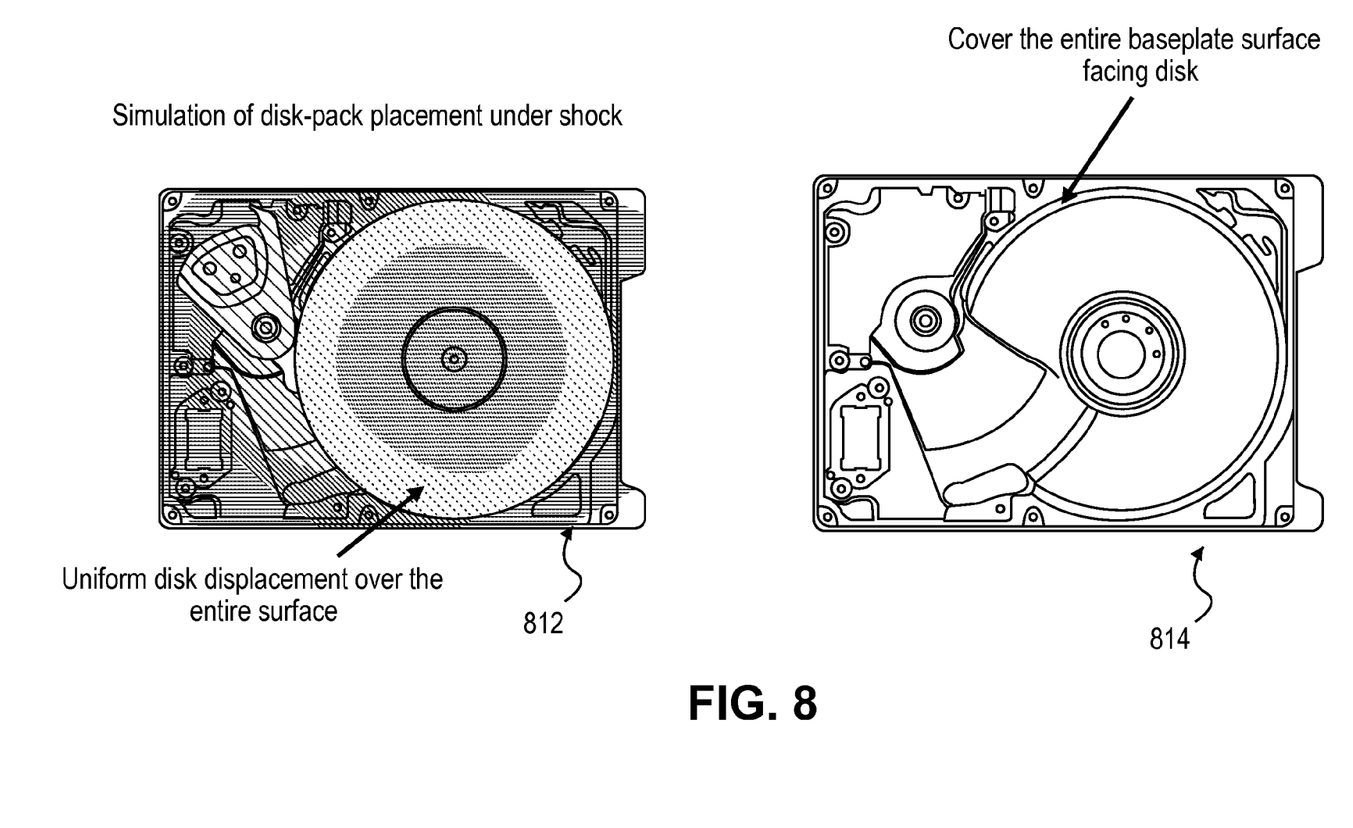
FIG. 8 is a second illustration depicting how to determine the location of a recessed region according to an embodiment of the invention.

As another example, FIG. 8 is a second illustration depicting how to determine the location of a recessed region according to an embodiment of the invention. Illustration 812 depicts a HDD undergoing a mechanical shock. The location of maximum disk displacement is shown in illustration 812 as being uniformly distributed over the disk. As a result, the recessed region is formed as a circular indentation or groove, in the baseplate (as depicted in illustration 814), and aligned with the shape of the disk to provide additional clearance between the baseplate and the entire disk.

Figures 9A, 9B:
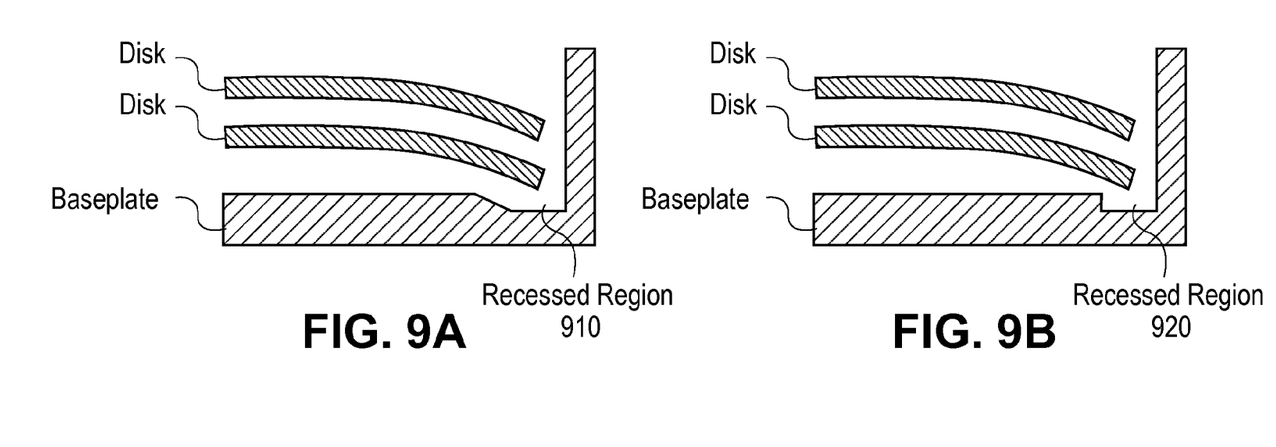
FIGS. 9A-D are illustrations of physical dimensions of the recessed region according to various embodiments of the invention.
Figures 9C, 9D:
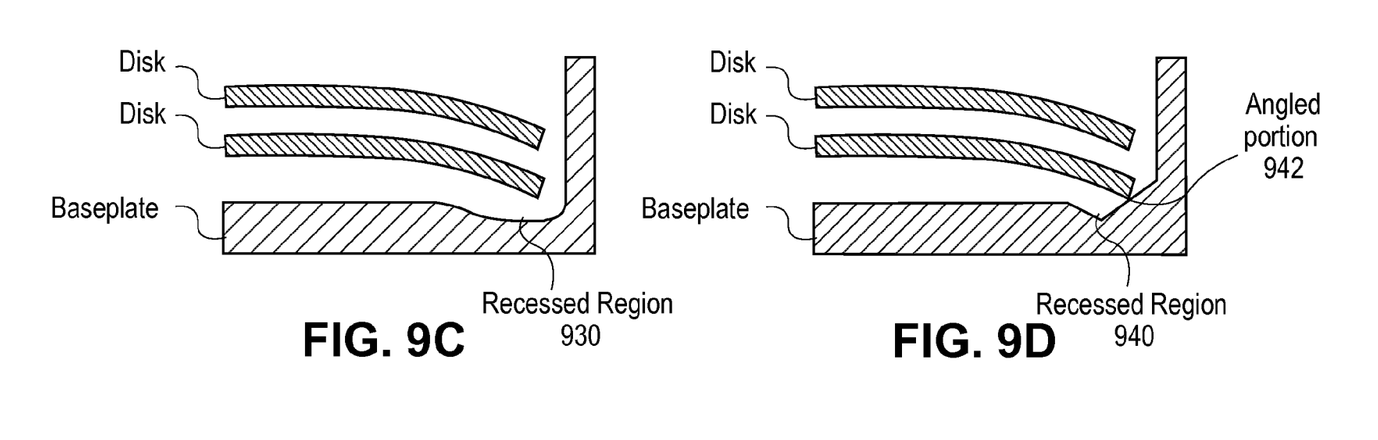

The actual shape or dimensions of a recessed region may differ across embodiments. FIGS. 9A-D are illustrations of physical dimensions of the recessed region according to various embodiments of the invention. FIG. 9A depicts recessed region 910 having at least one obtuse angle. FIG. 9B depicts recessed region 920 having at least one right angle. FIG. 9C depicts recessed region 930 having a smooth, curved surface without any angles. FIG. 9D depicts recessed region 940 having an angled portion 942 that a surface that is at an oblique angle to the surface of magnetic-recording disk which opposes the baseplate. Advantageously, in such an embodiment, the magnetic-recording disk makes contact with the surface of angled portion 942 upon a deformation of the magnetic-recording disk towards the baseplate. Angled portion 942 may be positioned so that a non-data zone of the magnetic-recording disk makes contact with angled portion 942 to ensure that no other portion of the magnetic-recording disk makes contact with the baseplate upon the HDD receiving a mechanical shock. Note that the examples shown in FIGS. 9A-D are meant to illustrate some, but not all, of embodiments of the invention, as the recessed region may be implemented using other shapes, indentations, recesses, or grooves not shown in FIGS. 9A-D.

In an embodiment, a recessed region may comprise a layer of dampening material at a position where the magnetic-recording disk makes contact with the recessed portion upon a deformation of the magnetic-recording disk towards the baseplate. The dampening material acts a cushion to prevent damage to the disk as well as prevent the introduction of harmful airborne particles into the interior of the HDD which may result from parts scraping or colliding with one another. The dampening material may be made out a variety of different materials, such as the material from which a crash stop is made from.

Aluminum Disks

Typically, in mobile hard-disk drives, magnetic-recording disks are constructed using a core layer of glass which may be enclosed in one or more metal layers. For example the glass layer may be 0.8 mm thick. Glass is a desirable material for use in this manner as it has good mechanical performance in that glass does not excessively deform in response to a mechanical shock.

Unfortunately, glass is more expensive than other materials, such as aluminum. While aluminum is cheaper than glass, it also deforms slighter more than glass in response to receiving a mechanical shock. Advantageously, by using embodiments of the invention, magnetic-recording disks with an aluminum interior layer may be used, as embodiments are more tolerant of a slight deformation in the magnetic-recording disk as a result of the increased amount of clearance between the baseplate and the magnetic-recording disk. As a result, embodiments of the invention employing disks comprising aluminum may be made with less expense than prior approaches.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
   an enclosure comprising a baseplate;
   a magnetic read/write head;
   a magnetic-recording disk rotatably mounted on a spindle;
   a drive motor having a motor shaft attached to the spindle for rotating the magnetic-recording disk; and
   a voice-coil motor configured to move the magnetic read/write head to access portions of the magnetic-recording disk,
   wherein the surface of the baseplate which opposes the magnetic-recording disk comprises a recessed region near the outer diameter (OD) of the magnetic-recording disk, and wherein the recessed region increases clearance between the magnetic-recording disk and the baseplate.

2. The hard-disk drive of claim 1, wherein the recessed region is a circular indentation aligned with the outer diameter (OD) of the magnetic-recording disk.

3. The hard-disk drive of claim 1, wherein the recessed region is an indentation in the baseplate that corresponds to a segment of the circular shape of the magnetic-recording disk.

4. The hard-disk drive of claim 1, wherein the magnetic-recording disk is constructed using aluminum.

5. The hard-disk drive of claim 1, wherein the recessed region comprises at least one right angle.

6. The hard-disk drive of claim 1, wherein the recessed region comprises at least obtuse angle.

7. The hard-disk drive of claim 1, wherein the recessed region comprises smooth, curved surface without any angles.

8. The hard-disk drive of claim 1, wherein the structure and placement of the recessed region is designed so that only a non-data zone of the magnetic-recording disk can make physical contact with the recessed region.

9. The hard-disk drive of claim 1, wherein the recessed region has an angled portion having a surface that is at an oblique angle to the surface of magnetic-recording disk which opposes the baseplate, and wherein the magnetic-recording disk makes contact with the surface of the angular portion upon a deformation of the magnetic-recording disk towards the baseplate.

10. The hard-disk drive of claim 1, wherein the recessed region comprises dampening material at a position where the magnetic-recording disk makes contact with the recessed portion upon a deformation of the magnetic-recording disk towards the baseplate.

11. A baseplate for use in a rotating disk drive, comprising:
    a surface of the baseplate which opposes a recording disk; and
    a recessed region near the outer diameter (OD) of the recording disk, and
    wherein the recessed region increases clearance between the recording disk and the baseplate.

12. The baseplate of claim 1, wherein the recessed region is a circular indentation aligned with the outer diameter (OD) of the recording disk.

13. The baseplate of claim 11, wherein the recessed region is an indentation in the baseplate that corresponds to a segment of the circular shape of the recording disk.

14. The baseplate of claim 11, wherein the recording disk is constructed using aluminum.

15. The baseplate of claim 11, wherein the recessed region comprises at least one right angle.

16. The baseplate of claim 11, wherein the recessed region comprises at least obtuse angle.

17. The baseplate of claim 11, wherein the recessed region comprises smooth, curved surface without any angles.

18. The baseplate of claim 11, wherein the structure and placement of the recessed region is designed so that only a non-data zone of the recording disk can make physical contact with the recessed region.

19. The baseplate of claim 11, wherein the recessed region has an angled portion having a surface that is at an oblique angle to the surface of recording disk which opposes the baseplate, and wherein the recording disk makes contact with the surface of the angular portion upon a deformation of the recording disk towards the baseplate.

20. The baseplate of claim 11, wherein the recessed region comprises dampening material at a position where the recording disk makes contact with the recessed portion upon a deformation of the recording disk towards the baseplate.

* * * * *